US012661965B2

(12) United States Patent
Ziskovsky et al.

(10) Patent No.: US 12,661,965 B2
(45) Date of Patent: Jun. 23, 2026

(54) ELECTRIC AXLE AND ELECTRIC AXLE PRODUCT LINE

(71) Applicant: Dana Automotive Systems Group, LLC, Maumee, OH (US)

(72) Inventors: Darren J. Ziskovsky, Bowling Green, OH (US); Eric M. Engerman, Plymouth, MI (US); Ryan D. Nelms, Weatherford, TX (US); Benjamin Powell, Austin, TX (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/894,520

(22) Filed: Sep. 24, 2024

(65) Prior Publication Data

US 2026/0084507 A1    Mar. 26, 2026

(51) Int. Cl.
B60K 1/02    (2006.01)

(52) U.S. Cl.
CPC ..................................... B60K 1/02 (2013.01)

(58) Field of Classification Search
CPC ........................................................ B60K 1/02
See application file for complete search history.

(56) References Cited

U.S. PATENT DOCUMENTS

| | | | |
|---|---|---|---|
| 8,870,698 B2 | 10/2014 | Mack et al. | |
| 9,593,754 B2 | 3/2017 | Sten | |
| 9,637,127 B1 | 5/2017 | Cooper | |
| 9,707,834 B2 | 7/2017 | Lee et al. | |
| 10,480,631 B2 | 11/2019 | Dzafic et al. | |
| 10,801,602 B2 | 10/2020 | Peng et al. | |
| 11,149,823 B2 | 10/2021 | Engerman | |
| 11,460,096 B2 | 10/2022 | Ziech | |
| 11,718,172 B1 * | 8/2023 | Engerman | B60K 17/046 |
| | | | 475/331 |
| 11,845,329 B2 | 12/2023 | Chopra et al. | |
| 11,946,542 B1 * | 4/2024 | Li | B60L 15/20 |
| 11,953,090 B1 * | 4/2024 | Lee | F16H 61/2807 |
| 2010/0116569 A1 * | 5/2010 | Morrow | B60W 10/08 |
| | | | 180/65.1 |
| 2013/0124045 A1 * | 5/2013 | Suzuki | B62D 7/159 |
| | | | 701/41 |
| 2015/0151634 A1 | 6/2015 | Smetana | |
| 2019/0323566 A1 * | 10/2019 | Kamiya | B60K 23/08 |
| 2020/0096084 A1 * | 3/2020 | Engerman | F16H 3/006 |
| 2023/0313871 A1 * | 10/2023 | Ziemer | F16H 3/66 |
| | | | 180/243 |
| 2024/0308353 A1 * | 9/2024 | Takase | B60L 3/003 |

FOREIGN PATENT DOCUMENTS

| | | |
|---|---|---|
| CN | 113928101 A | 1/2022 |
| EP | 3724015 B1 | 7/2021 |

* cited by examiner

*Primary Examiner* — Farhana Pervin
(74) *Attorney, Agent, or Firm* — McCoy Russell LLP

(57)    ABSTRACT

A system and method for an electric axle. The electric axle includes, in one example, a traction motor, an input planetary gear set arranged coaxial to the traction motor and including a sun gear rotationally coupled to the traction motor, a carrier including a first section coupled to multiple carrier shafts and a second section removably coupled to the multiple carrier shafts, and multiple planet gears rotationally mounted on the multiple carrier shafts. In the electric axle, the second section is rotationally coupled to a downstream component and the downstream component is arranged coaxial to the input planetary gear set.

17 Claims, 18 Drawing Sheets

1201

1900

ELECTRIC AXLE AND ELECTRIC AXLE PRODUCT LINE

TECHNICAL FIELD

The present disclosure relates to an electric axle and axle product line with a modular architecture.

BACKGROUND AND SUMMARY

Segments of the vehicle market are moving towards electrification. The inventors have recognized a need to further increase electric powertrain compactness and power output in a cost effective package. Attempts have been made to develop electric axles for hybrid and all-electric vehicle platforms. Electric axles include motors, gear trains, and differentials that are packaged together for delivering power to drive wheels.

The inventors have recognized the abovementioned challenges and developed an electric axle to at least partially overcome the challenges. The electric axle includes, in one example, a traction motor and an input planetary gear set arranged coaxial to the traction motor. The input planetary gear set includes a sun gear rotationally coupled to the traction motor, a carrier that includes a first section coupled to multiple carrier shafts and a second section removably coupled to the multiple carrier shafts, and multiple planet gears rotationally mounted on the multiple carrier shafts. In the electric axle, the second section is rotationally coupled to a downstream component and the downstream component is arranged coaxial to the input planetary gear set. In this way, a modular electric axle architecture is achieved in a space efficient layout that is able to be incorporated into a wider variety of vehicle platforms, thereby increasing customer appeal.

In one example, the downstream component is a multispeed planetary gear set. In this way, the modularity of the electric axle is leveraged to provide shifting functionality that allows for more efficient operation of the electric machine.

In another example, the downstream component is an output planetary gear set. In this way, the electric axle achieves a desired gear reduction ratio in a more compact package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A modular family of electric axles is described herein that allows for interchangeability of parts and components. The modular product line allows the electric powertrains to utilize various length motors, various overall gear ratios, single and multispeed architectures, as well as various differential designs to meet different vehicle platform demands. The modular electric axle product line allows for the reuse of components across different applications, but also allows for the flexibility to customize the electric axles for specific applications. The electric axles include a central section with an electric motor, planetary gear sets, a differential, and an optional integrated inverter, where the motor planetary gear sets, and the differential are coaxially arranged. This modular family of coaxial electric axles (e.g., electric beam axles) can be utilized in either a front axle or a rear axle in hybrid or all-electric vehicles.

Figure 1:
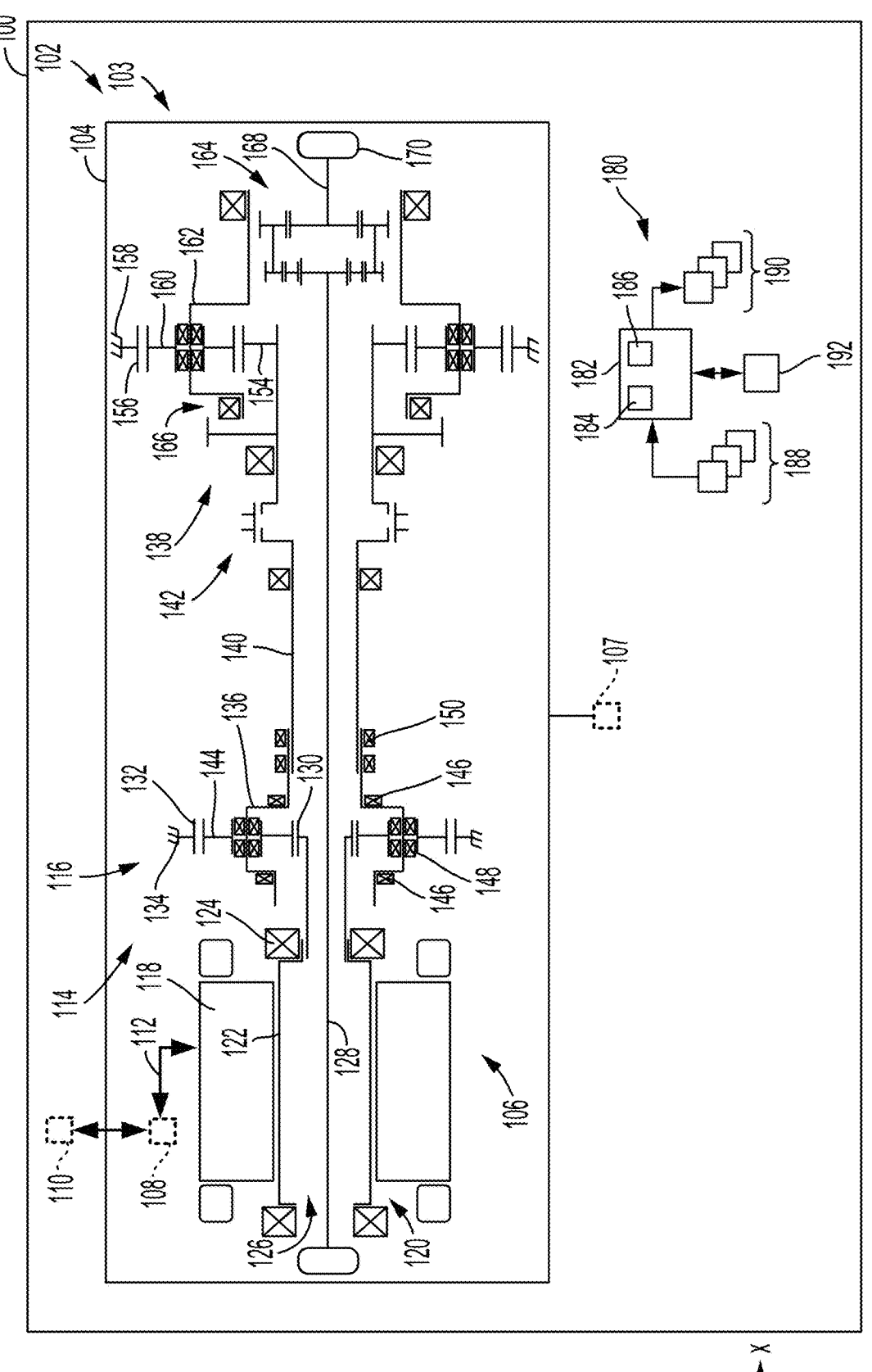
FIGS. 1-3 show different electric axle architectures where each of the electric axles includes an input planetary gear set.

FIG. 1 shows an electric vehicle (EV) 100 that includes a powertrain 102 with an electric axle assembly 103 with an electric axle 104 (e.g., a front electric axle, in one example). As such, The EV 100 is a hybrid EV in the illustrated example. In the front axle example, the front axle may be steerable. Further, in some examples the other axle may be driven by an internal combustion engine (ICE). However, in other examples, the ICE may be configured to charge a traction battery and/or other suitable energy storage device. Even further, in other examples, the EV 100 may be an all-electric vehicle (e.g., battery electric vehicle (BEV)).

As described herein an electric axle is an electric drive incorporated into an axle. The electric axle may be an electric beam axle, in one example. A beam axle is an axle with mechanical components structurally supporting one another and extending between drive wheels. For instance, the beam axle may be a structurally continuous structure that spans the drive wheels on a lateral axis, in one embodiment. Thus, wheels coupled to the beam axle substantially move in unison when articulating, during, for example, vehicle travel on uneven road surfaces. To elaborate, the camber angle of the wheels may remain substantially constant as the suspension moves through its travel. The beam axle may be coupled to a dependent suspension system 107, in one example. Therefore, the electric axle may be an unsprung mass.

The electric axle 104 includes an electric machine 106 (e.g., a traction motor). The electric machine 106 may be an electric motor-generator, for example. For instance, the electric machine 106 may be designed as a multi-phase alternating current (AC) motor-generator. However, in other examples, the electric machine may be a motor without generator capabilities.

As illustrated in FIG. 1, the electric machine 106 may be electrically coupled to an inverter 108. The inverter 108 is designed to convert direct current (DC) electric power to alternating current (AC) electric power and vice versa.

Therefore, the electric machine 106 may be an AC electric machine, as previously indicated. However, in other examples, the electric machine may be a DC electric machine and the inverter may therefore be omitted from the electric drive, in such an example. The inverter 108 may receive electric energy from one or more energy storage device(s) 110 (e.g., traction batteries, capacitors, combinations thereof, and the like). Arrows 112 signify the electric energy transfer between the electric machine 106, the inverter 108, and the energy storage device(s) 110 that may occur during different modes of electric axle operation (e.g., a drive mode and a regeneration mode). As such, during a drive mode, electric energy may flow from the energy storage device(s) 110 to the electric machine 106 and during a regenerative mode, electric energy may flow in the opposite direction from the electric machine to the energy storage device(s). The inverter 108 may be integrated into the electric axle 104, in one example.

The electric axle 104 further includes a gear train 114 that is coaxially arranged with the electric machine 106, thereby enabling the electric axle to achieve a space efficient package that is able to be more easily integrated into a wider variety of vehicle platforms. The gear train 114 includes an input planetary gear set 116. Specifically, in the illustrated example, the input planetary gear set 116 is a simple planetary gear set. A simple planetary gear set is a planetary gear set that solely includes a ring gear, a set of planet gears, a carrier, and a sun gear. To elaborate, as described herein a simple planetary gear set is a planetary gear set with solely a ring gear, a sun gear, a carrier, and multiple planet gears that are in the same plane as the ring gear and the sun gear and rotate on the carrier. Further, in the simple planetary gear set, each planet gear meshingly engages both the sun gear and the ring gear. However, in other examples, the input gear set may be a different type of planetary gear set such as a compound planetary gear set.

The electric machine 106 includes a stator 118 and a rotor 120 that includes a rotor shaft 122. The rotor shaft 122 is either directly coupled to the input planetary gear set 116 or coupled to the input planetary gear set using an intermediary shaft. Bearings 124 are coupled to the rotor shaft 122 and enable rotation thereof. Further, the rotor shaft 122 includes a central opening 126 to enable an axle shaft 128 to pass therethrough, as discussed in greater detail herein.

The input planetary gear set 116 includes a sun gear 130 that is rotationally coupled (e.g., directly rotationally coupled) to the rotor 120 of the electric machine 106. In the illustrated example, a ring gear 132 in the input planetary gear set 116 is mechanically grounded via a stationary component 134 such as a housing or other suitable component. A carrier 136 is coupled to a downstream component, in the illustrated example. In this way, the input planetary gear set achieves a desired gear reduction ratio. However, in other examples, another component in the input planetary gear set may be coupled to the downstream component.

Specifically, the downstream component is an output planetary gear set 138 which is a simple planetary gear set in the in the illustrated example. Specifically, a shaft 140 is rotationally coupled to the carrier 136. Further, the shaft 140 is coupled a disconnect clutch 142 for the output planetary gear set 138. The shaft 140 may specifically be splined, welded, and/or otherwise suitably rotationally coupled to the carrier 136. In other example, the output planetary gear set 138 may be a different type of gear set such as a compound planetary gear set.

A set of planet gears 144 are rotatably mounted to the carrier 136. Bearings 146 are coupled to opposing sides of the carrier 136, in the illustrated example. The carrier 136 is formed in removably attached sections to increase the modularity of the electric axle 104. The construction of the carrier is expanded upon herein with regard to at least FIG. 6. As shown in FIG. 1, bearings 148 (e.g., needle roller bearings) are coupled to the carrier 136 and the set of planet gears 144. Further, in the illustrated example, bearings 150 are coupled to the mechanical interface between the carrier 136 and the shaft 140. However, other bearing arrangements are possible.

Further, in the illustrated example, the output planetary gear set 138 includes a sun gear 154 that is rotationally coupled to the disconnect clutch 142. The disconnect clutch 142 may be a sliding clutch, in one example, or a friction clutch in another example. Further, in the illustrated example, a ring gear 156 is grounded via a stationary component 158. A set of planet gears 160 is rotationally mounted to a carrier 162 that is rotationally coupled to a differential 164. Bearings 166 are coupled to different sections of the carrier 162, that are elaborated upon herein. The differential 164 is a torque-sensing limited-slip differential in the illustrated example. However, other suitable types of differentials may be used in the electric axle 104 in other examples.

The axle shaft 128 and another axle shaft 168 are rotationally coupled to the differential 164. In turn drive wheels 170 are rotationally coupled to the axle shafts 128 and 168. In certain examples, when end gear reductions may be coupled to the axle shafts.

The EV 100 may also include a control system 180 with a controller 182. The controller 182 includes a processor 184 and memory 186. The memory 186 holds instructions stored therein that when executed by the processor 184 cause the controller 182 to perform the various methods, control techniques, etc., described herein. The processor 184 may include a microprocessor unit and/or other types of circuits. The memory 186 includes known data storage mediums such as random access memory, read only memory, keep alive memory, combinations thereof, and the like.

The controller 182 may receive various signals from sensors 188 positioned in different locations in the EV 100 and the multi-speed electric axle 104, more specifically. The sensors may include an electric machine speed sensor, energy storage device temperature sensor(s), clutch position sensors, an energy storage device state of charge sensor(s), wheel speed sensors, and the like. The controller 182 may also send control signals to various actuators 190 coupled at different locations in the EV 100, and the multi-speed electric axle 104. For instance, the controller 182 may send signals to the inverter 108 to adjust the rotational speed of the electric machine 106. The other controllable components in the vehicle and powertrain may function in a similar manner with regard to command signals and actuator adjustment. For instance, the controller 182 may send signals to the clutch 142 to engage and disengage the clutch to operate the axle in different modes, which are expanded upon herein. The controller and control system shown in FIG. 1 may be used in the other electric axle examples described herein. The controller may further be configured to command shifts between operating gears in a multi-speed gear train via clutch operation commands.

The EV 100 may also include one or more input device(s) 192 (e.g., an accelerator pedal, a brake pedal, a gear selector, a differential locker actuator, a console instrument panel, a touch interface, a touch panel, a keyboard, combinations thereof, and the like) in electronic communication with the controller 182. The input device(s) 192, responsive to operator input, may generate an acceleration adjustment request, a gear shift request when the electric axle includes a multi-speed gear train, and the like.

An axis system is provided in FIG. 1 as well as FIGS. 2-20, for reference, when appropriate. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
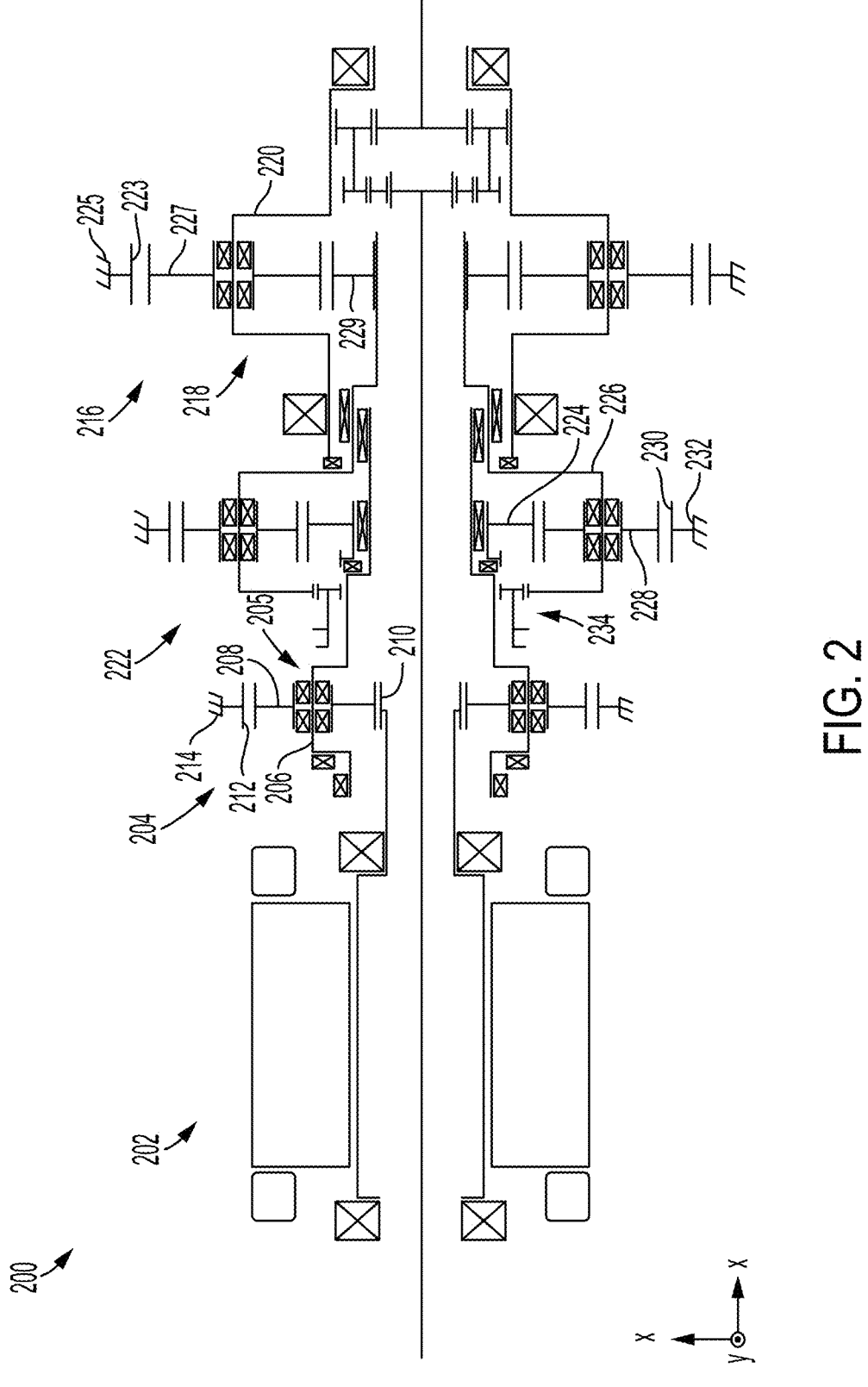

FIG. 2 shows another example of an electric axle 200 (e.g., a rear electric axle, in one example). The electric axle 200 again includes an electric machine 202 and an input planetary gear set 204. The electric machine 202 may have a similar size and construction to the electric machine 106 shown in FIG. 1. However, in other examples, a different type of motor with regard to size and/or profile may be used in the electric axle 200.

Further, the input planetary gear set 204 may have a similar size and construction to the input planetary gear set 116 aside from a downstream section 205 of a carrier 206 which is removably coupled to the carrier shafts on which a set of planet gears 208 are rotatably mounted. To elaborate, the sun gears, the planet gears, the carrier shafts, the ring gears, and the sun gears are identical in size and structure in the input planetary gear set 116 and the input planetary gear set 204. Thus, the input planetary gear set 204 includes a sun gear 210. The sun gear 210 is rotationally coupled to the electric machine 202. The input planetary gear set 204 further includes a ring gear 212 that is again grounded using a stationary component 214, the carrier 206, and the set of planet gears 208.

The electric axle 200 again includes an output planetary gear set 216 that may have a similar size and structure to the output planetary gear set 138, shown in FIG. 1, aside from an upstream portion 218 of a carrier 220 that is rotationally coupled to a multi-speed planetary gear set 222 which is described in greater detail below. Thus, the output planetary gear set 216 again includes a ring gear 223 which is grounded via a stationary component 225, a set of planet gears 227, and a sun gear 229.

The multi-speed planetary gear set 222 includes a sun gear 224, a carrier 226, a set of planet gears 228 that are rotatably mounted on the carrier 226, and a ring gear 230. In the illustrated example, the ring gear 230 is mechanically grounded via a stationary component 232.

To achieve the multi-speed functionality, the multi-speed planetary gear set 222 includes a clutch 234. In a first position the clutch 234 rotationally couples the carrier 206 to the sun gear 224. In a second position the clutch 234 rotationally couples the carrier 206 to the carrier 226. The clutch 234 may further be configured to operate in a neutral position where power flow between the input planetary gear set 204 and the multi-speed planetary gear set 222.

Figure 3:
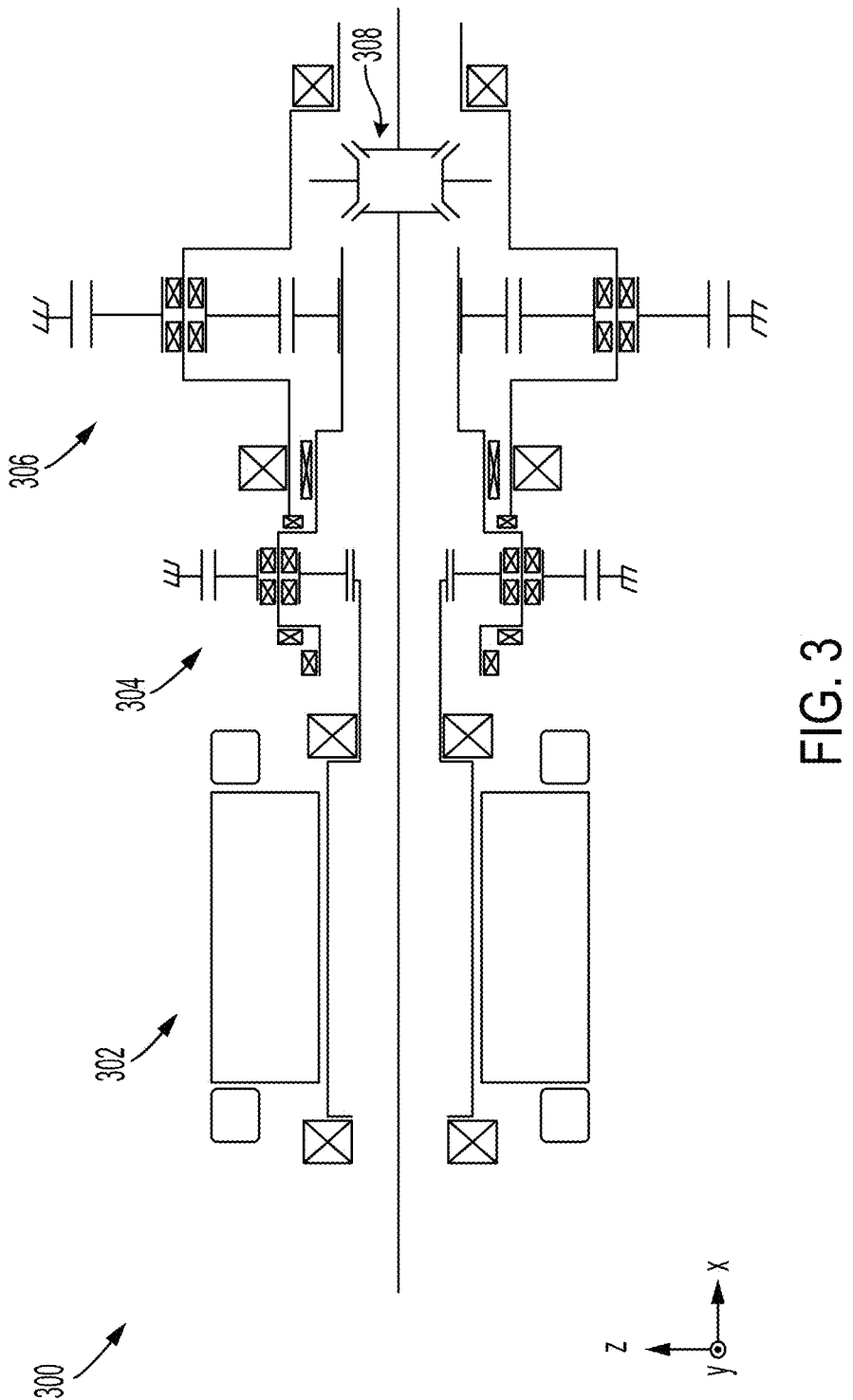

FIG. 3 shows another electric axle 300 (e.g., a rear electric axle, in one example). In the illustrated example, the electric axle 300 again includes an electric machine 302, an input planetary gear set 304, and an output planetary gear set 306. The electric machine 302 may have a similar construction to the electric machines 106 and 202 shown in FIGS. 1 and 2 respectively. FIG. 3 further shows a differential 308 (e.g., an open differential) that is rotationally coupled to the output planetary gear set. When compared to the electric axle 104 shown in FIG. 1, the electric axle 300 has a shorter lateral length and uses a different type of differential. However, aside from the shorter lateral length and the variance in differential type, the electric axle 300 and the electric axle 104 have a similar component construction. In this way, the modularity of the electric axle can be leveraged for integration of the axle into different vehicle platforms.

Figure 4:
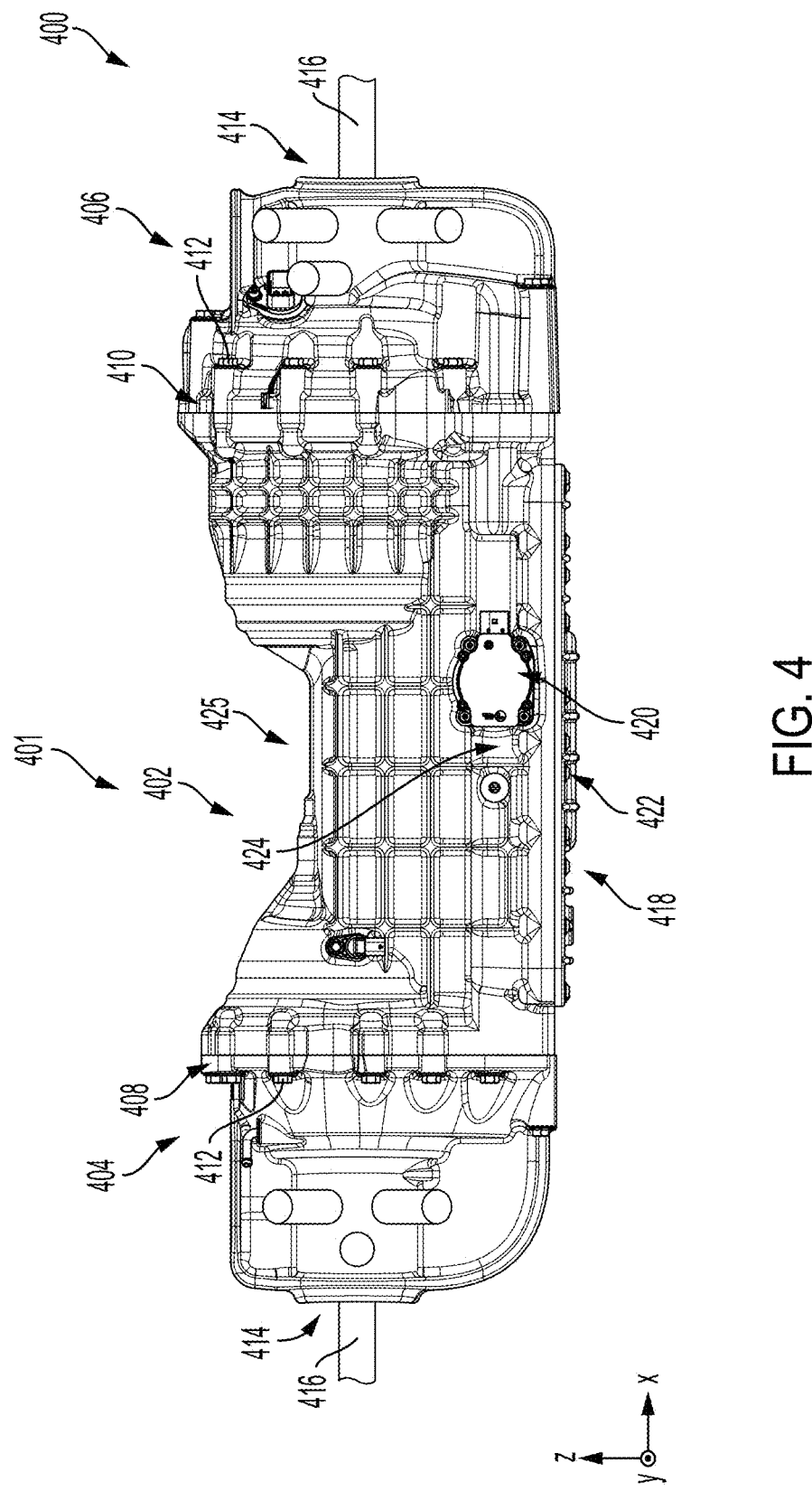
FIGS. 4-6 show different views of a detailed example of an electric axle with an input planetary gear set and an output planetary gear set.
Figure 5:
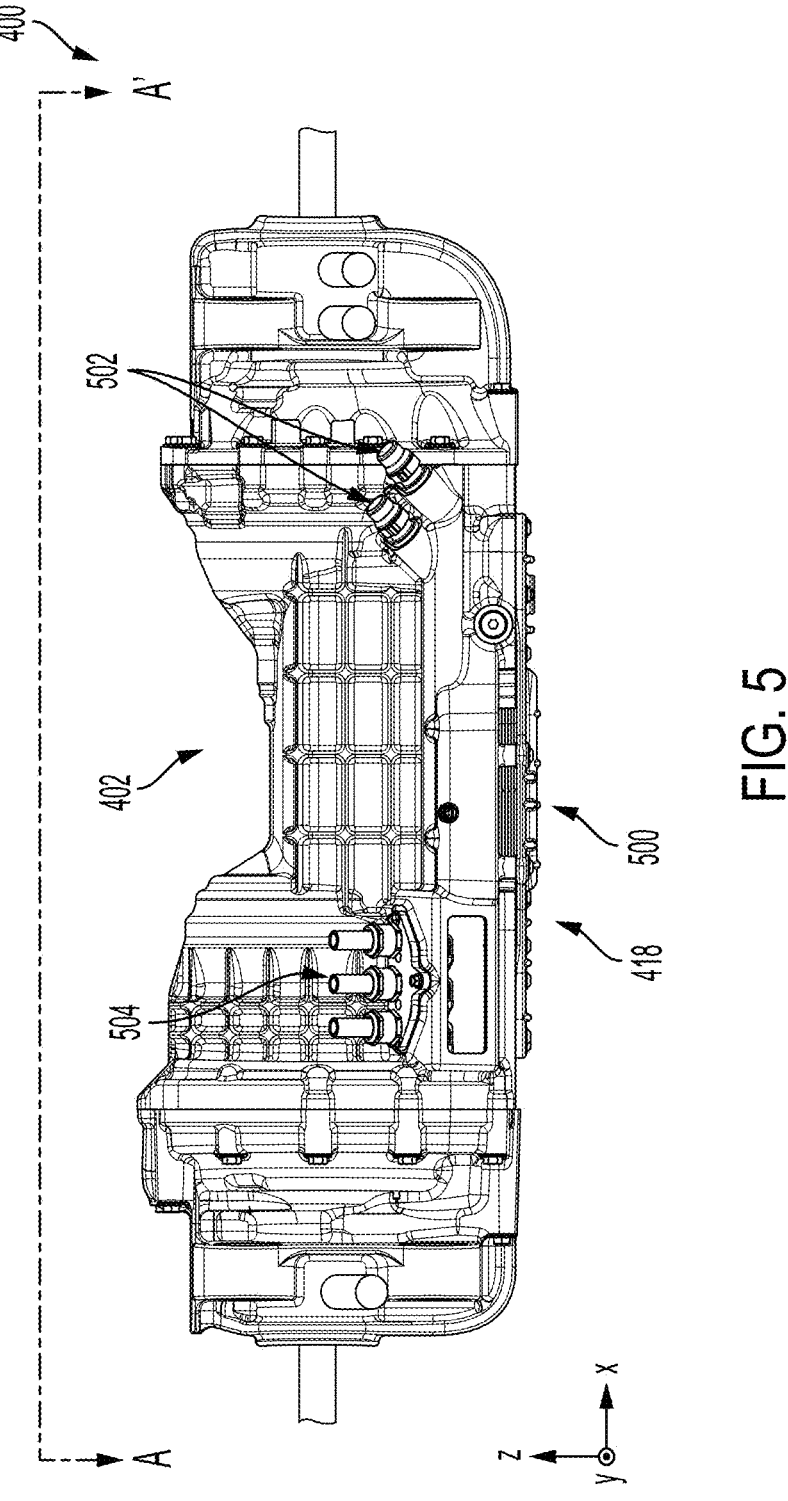
Figure 6:
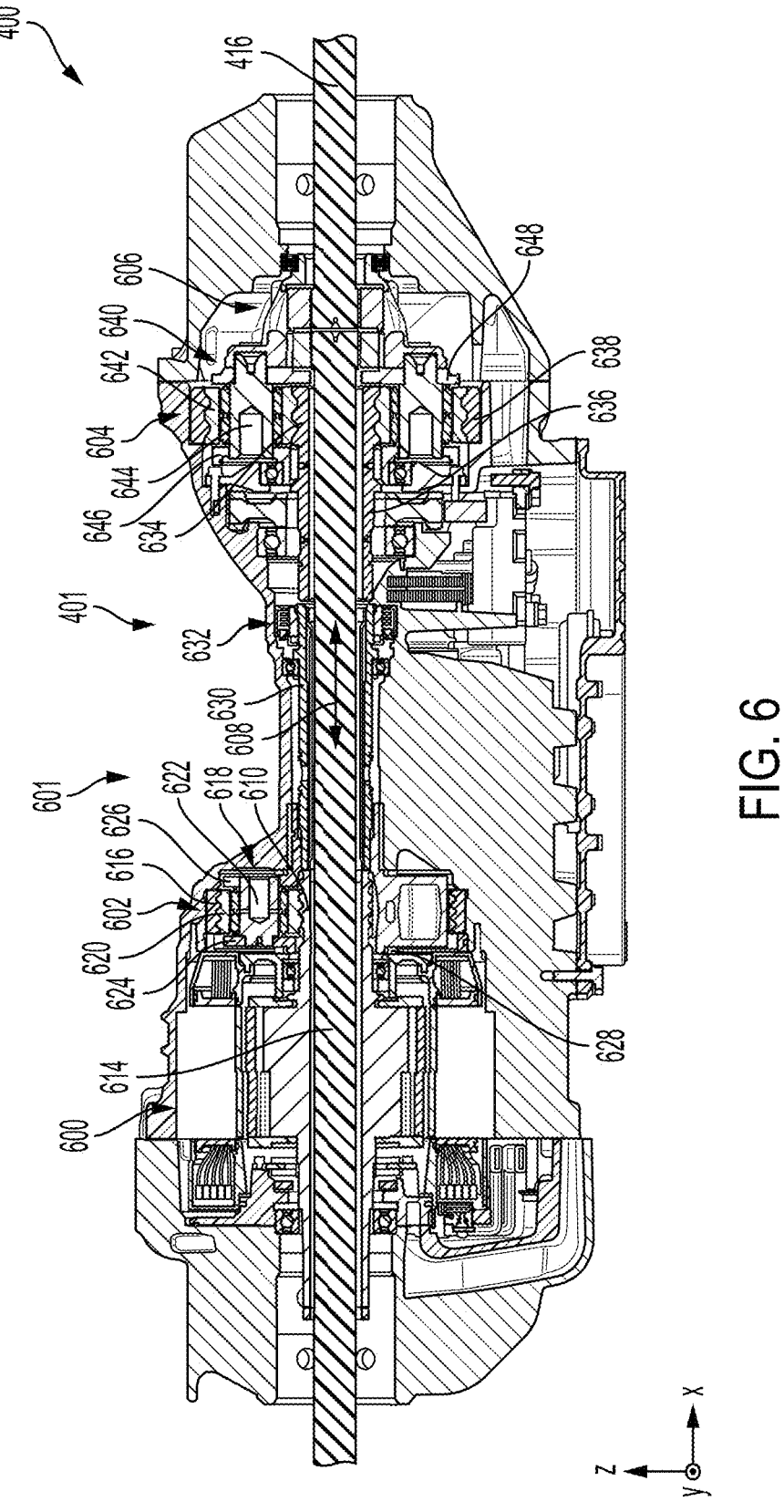

FIGS. 4-6 show a detailed example of an electric axle 400 that has a component architecture that corresponds to the electric axle 104 depicted in FIG. 1. As such, the electric axle 400 includes an electric machine, an input planetary gear set, and an output planetary gear set that are at least partially enclosed within a housing 401.

FIG. 4 specifically shows a front view of the electric axle 400 with the housing 401. The housing 401 may be divided into sections that are removably attached to one another. To expound, the housing 401 includes a body 402 with end covers 404 and 406 that are attached to opposing lateral sides 408 and 410 of the body. However, other housing configurations may be used in other examples. Bolts 412 and/or other suitable attachment devices may be used to attach the end covers 404 and 406 to the body 402 of the housing 401. In the illustrated example, the end covers 404 and 406 includes axle shaft openings 414 through which axle shafts 416 extend.

An oil pan 418 and/or an oil pump 420 may be coupled to the housing body 402. To elaborate, the oil pan 418 is coupled to a lower side 422 of the body 402 in the illustrated example. Additionally, the oil pump 420 is coupled to a longitudinal side 424 of the body 402 in the illustrated example. Further, the body 402 may include a recess 425 between sections of the housing that enclose the electric machine and the output planetary gear set.

FIG. 5 shows a rear view of the electric axle 400. The oil pan 418 coupled to the housing body 402, is again shown. Further, a heat exchanger 500 may also be coupled to the housing body 402. Coolant inlet and outlet ports 502 for the heat exchanger 500 may be incorporated into the housing body 402. An electrical interface 504 for the traction motor may further be coupled to the housing body 402. A cutting plane A-A' for the cross-sectional view depicted in FIG. 6 is also depicted in FIG. 5 for reference.

FIG. 6 shows a cross-sectional view of the electric axle 400 with a gear train 601 and an electric machine 600. The gear train 601 may include the input planetary gear set 602 and the output planetary gear set 604. The electric axle 400 further includes a differential 606 in the example depicted in FIG. 6. As shown, the aforementioned components have a coaxial arrangement along a lateral axis 608.

The input planetary gear set 602 includes a sun gear 610 is coupled to or formed with a rotor shaft 614 of the electric machine 600. The input planetary gear set 602 further includes a ring gear 616 that is grounded by the housing 401 and a carrier 618 with a set of planet gears 620 rotatably mounted thereto.

The carrier 618 is formed in separate removably attached sections. To elaborate, the carrier 618 includes carrier shafts 622 on which the planet gears 620 are rotatably mounted. An upstream section 624 and a downstream section 626 are mounted to the carrier shafts 622. A bearing 628 (e.g., a thrust bearing) may be arranged between the upstream section 624 and the electric machine 600.

The downstream section 626 is rotatably coupled to a shaft 630. A disconnect clutch 632 is provided between the shaft 630 and the output planetary gear set 604. The output planetary gear set 604 specifically includes a sun gear 634 coupled to a shaft 636 that extends to the disconnect clutch 632. The output planetary gear set 604 further includes a ring gear 638 that is grounded by the housing 401 and a carrier 640 with a set of planet gears 642 rotatably mounted thereto.

The carrier 640 is formed in separate removably attached sections. To elaborate, the carrier 640 includes carrier shafts 644 on which the planet gears are rotatably mounted. An upstream section 646 and a downstream section 648 are mounted to the carrier shafts 644. The downstream section 648 is rotatably coupled to an input of the differential 606. The differential 606 is rotatably coupled to axle shafts 416. One of the axle shafts 416 extends through openings in the sun gear 634, the shaft 630, the sun gear 610, and the electric machine 600, in the illustrated example.

Figure 7:
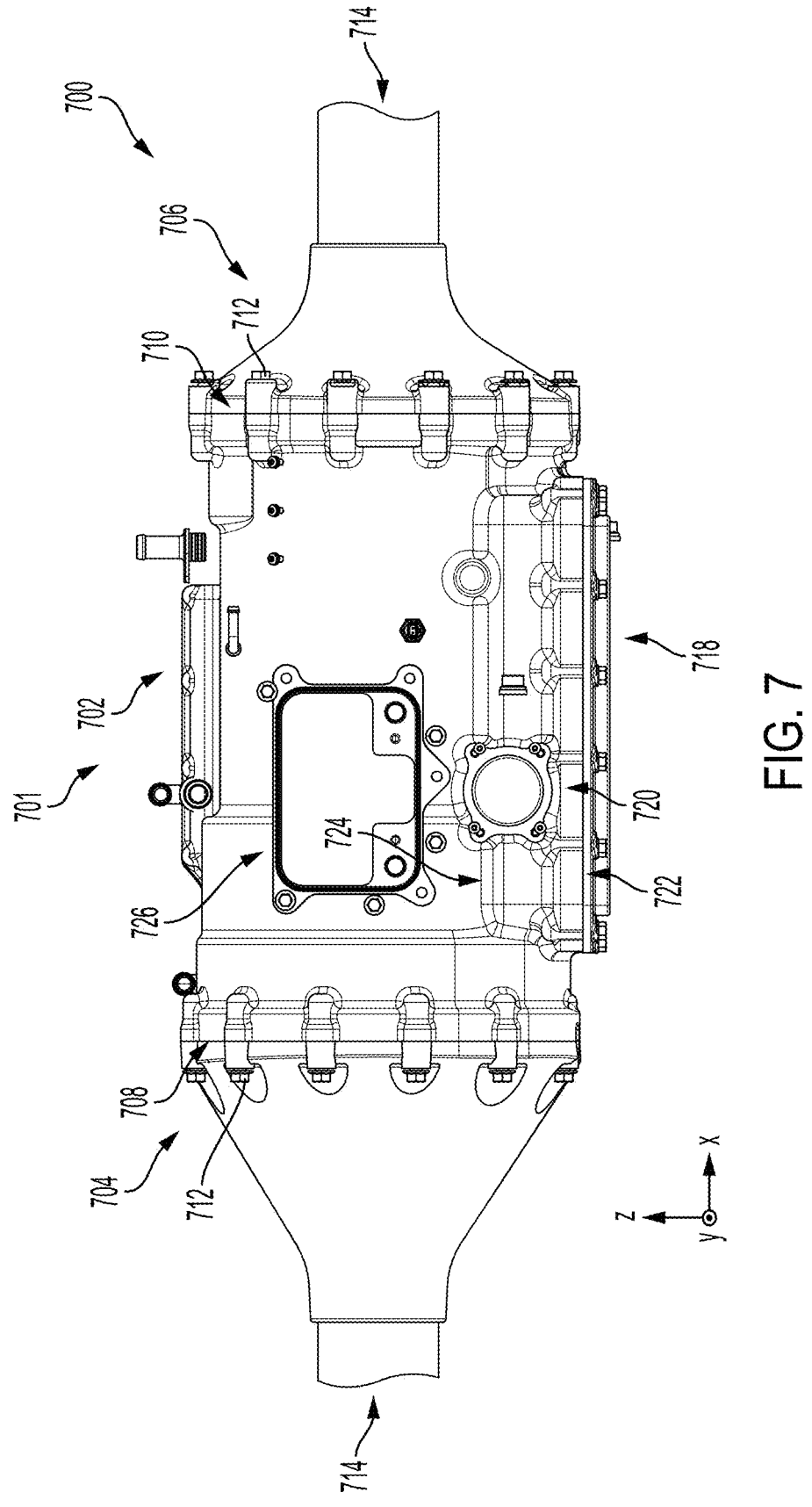
FIGS. 7-9 show different views of another detailed example of an electric axle with an input planetary gear set and an output planetary gear set.
Figure 8:
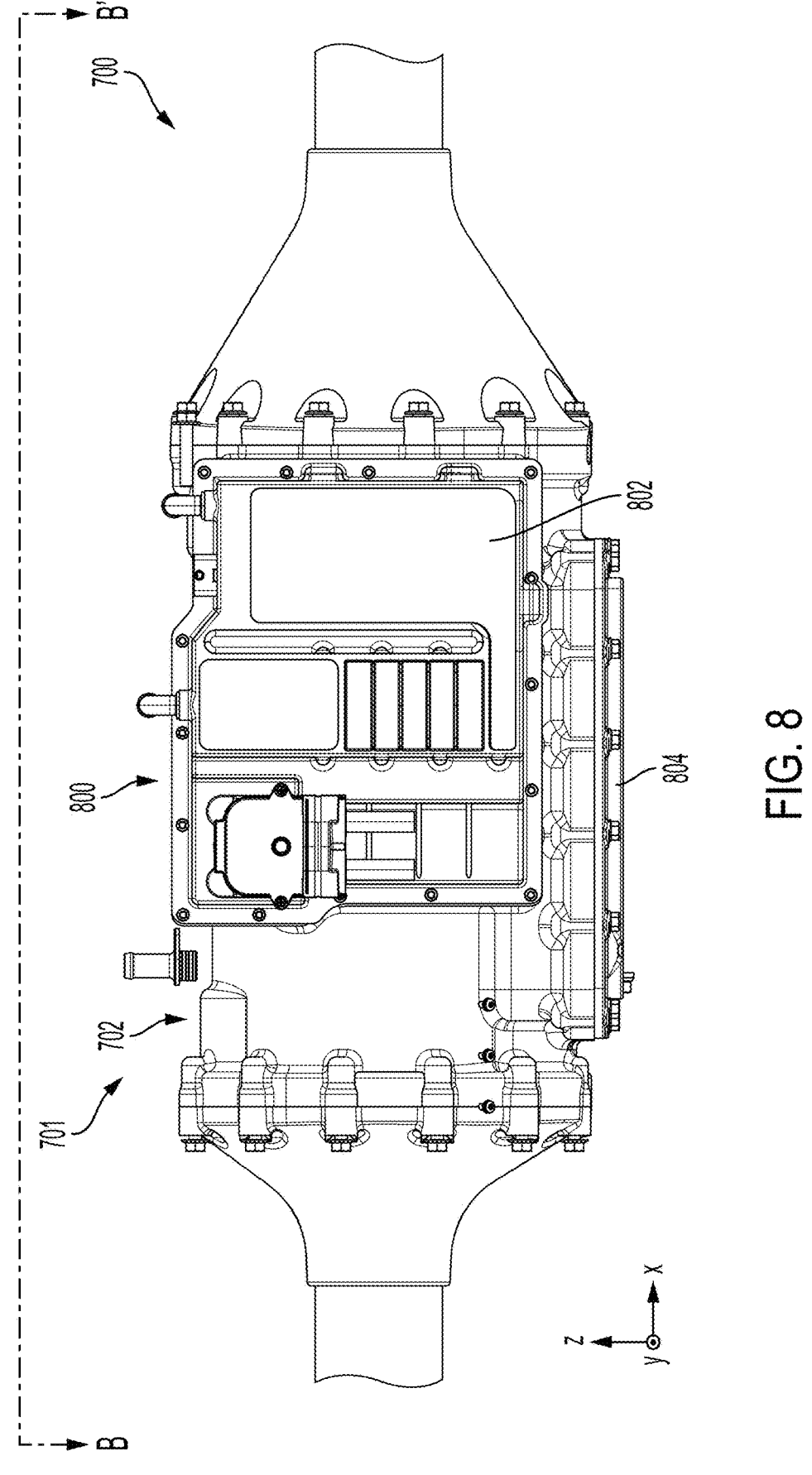
Figure 9:
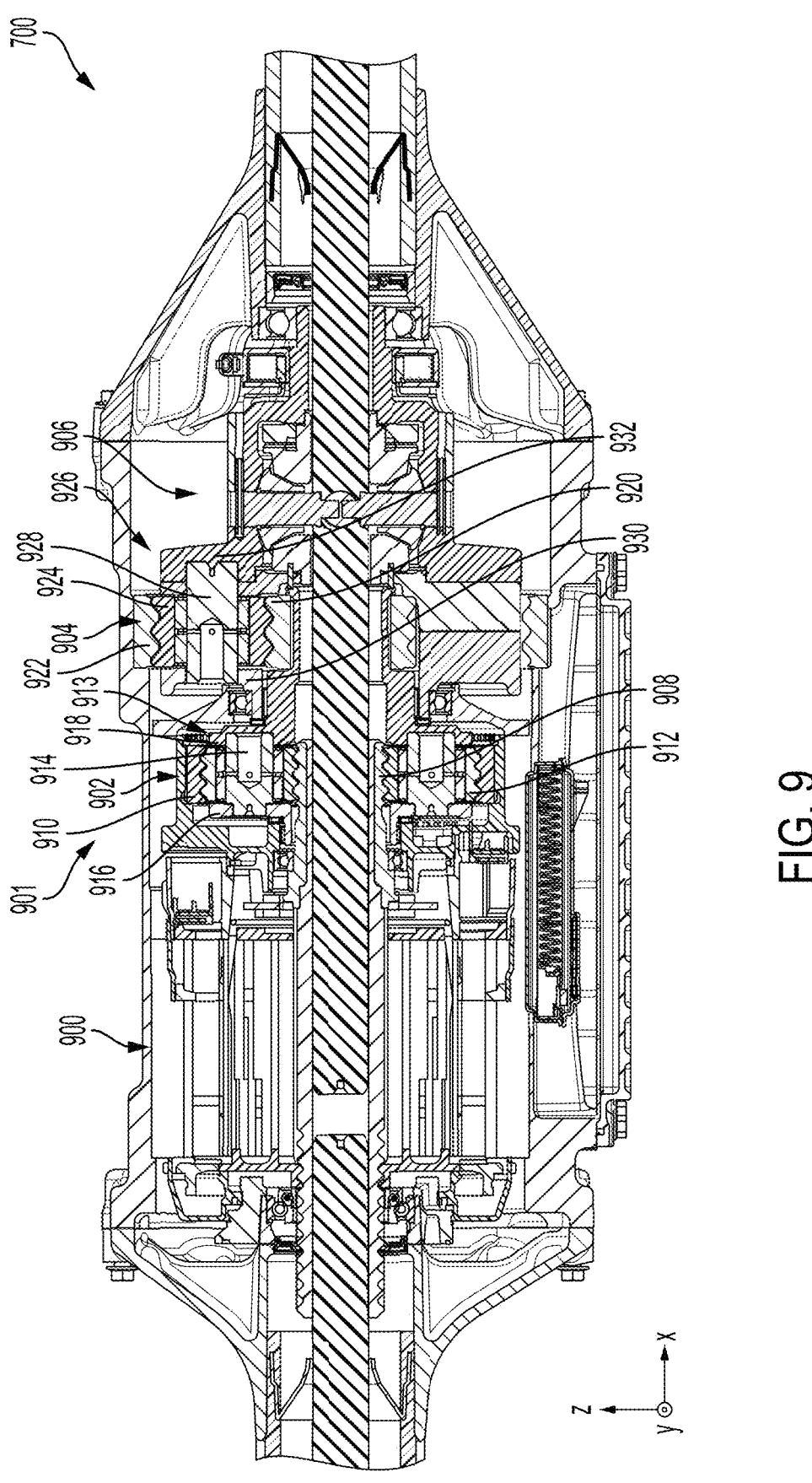

FIGS. 7-9 show a detailed example of an electric axle 700 that has a component architecture that corresponds to the electric axle 300 depicted in FIG. 3. As such, the electric axle 700 includes an electric machine, an input planetary gear set, and an output planetary gear set that are at least partially enclosed within a housing 701.

FIG. 7 specifically shows a front view of the electric axle 700 with the housing 701. The housing 701 may be divided into sections that are removably attached to one another. To expound, the housing 701 includes a body 702 with end covers 704 and 706 that are attached to opposing lateral sides 708 and 710 of the body. However, other housing configurations may be used in other examples. Bolts 712 and/or other suitable attachment devices may be used to attach the end covers 704 and 706 to the body 702 of the housing 701.

In the illustrated example, the end covers 704 and 706 includes axle shaft openings 714 through which axle shafts extend. An oil pan 718 and/or an oil pump 720 may be coupled to the housing body 702. To elaborate, the oil pan 718 is coupled to a lower side 722 of the body 702 in the illustrated example. Additionally, the oil pump 720 is coupled to a longitudinal side 724 of the body 702 in the illustrated example. Further, a heat exchanger 726 may also be coupled to the housing body 702.

FIG. 8 specifically shows a rear view of the electric axle 700 with the housing 701. An inverter 800 is removably coupled to the body 702. In this way, the inverter 800 is incorporated into the electric axle 700. A face 802 of the inverter 800 may be parallel to the z-x plane, in one example. Further, a face 804 of the oil pan 718 may be parallel to the x-y plane. However, other inverter and/or oil pan arrangements have been contemplated. A cutting plane B-B' for the cross-sectional view depicted in FIG. 9 is also provided in FIG. 8 for reference.

FIG. 9 shows a cross-sectional view of the electric axle 700 with a gear train 901 and an electric machine 900. The gear train 901 includes an input planetary gear set 902 and an output planetary gear set 904, in the illustrated example. The electric axle 700 further include a differential 906 in the illustrated example. The electric machine 900 may be similar in size and construction to the electric machine 600 shown in FIG. 6.

The input planetary gear set 902 again includes a sun gear 908, a ring gear 910 that is grounded by the housing 701, and a set of planet gears 912 that are rotatably mounted on a carrier 913. The carrier 913 again includes carrier shafts 914 and an upstream section 916 and a downstream section 918 that are removably coupled to the carrier shafts. The carrier shafts 914 and the upstream section 916 are identical to the carrier shafts 622 and the upstream section 624 shown in FIG. 6. Further, the sun gear 908, the planet gears 912, and the ring gear 910 are identical to the sun gear 610, the planet gears 620, and the ring gear 616, shown in FIG. 6, respectively. However, the downstream section 918 of the carrier 913 differs from the previously described downstream carrier sections. In this way, input planetary gear set components are used across electric axle platforms, thereby simplifying axle manufacture.

The output planetary gear set 904 again includes a sun gear 920, a ring gear 922 that is grounded by the housing 701, and a set of planet gears 924 that are rotatably mounted on a carrier 926. The carrier 926 again includes carrier shafts 928 and an upstream section 930 and a downstream section 932 that are removably coupled to the carrier shafts. The carrier shafts 928 and the upstream section 930 are identical to the carrier shafts 644 and the upstream section 646 shown in FIG. 6. Further, the sun gear 920, the planet gears 924, and the ring gear 922 are identical to the sun gear 634, the planet gears 642, and the ring gear 638, shown in FIG. 6, respectively. However, the downstream section 932 of the carrier differs from the previously described downstream carrier sections. In this way, output planetary gear set components are used across different electric axle platforms, thereby simplifying axle manufacture.

Figure 10:
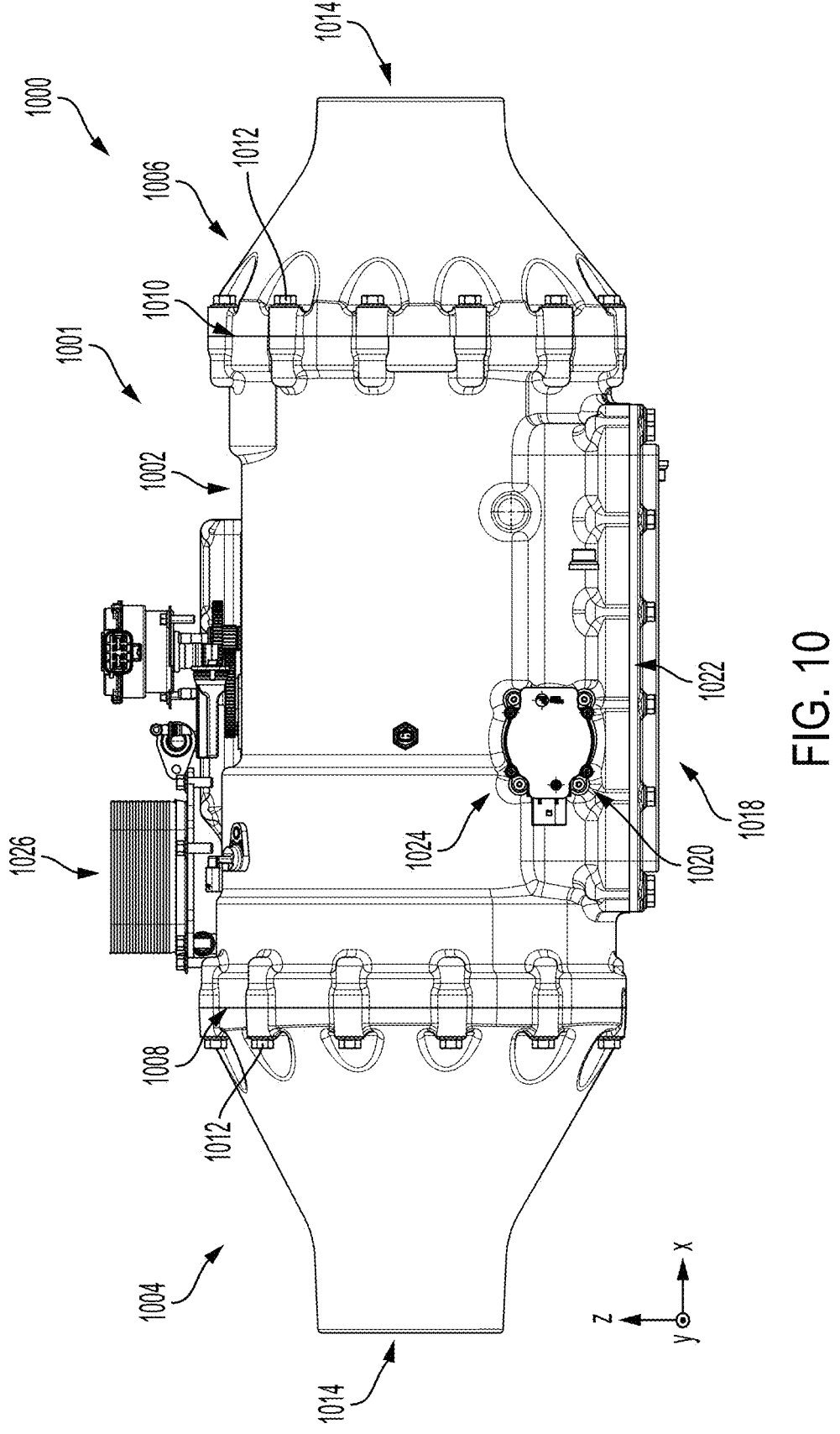
FIGS. 10-12 show different view of a detailed example of an electric axle with an input planetary gear set, a multi-speed planetary gear set, and an output planetary gear set.
Figure 11:
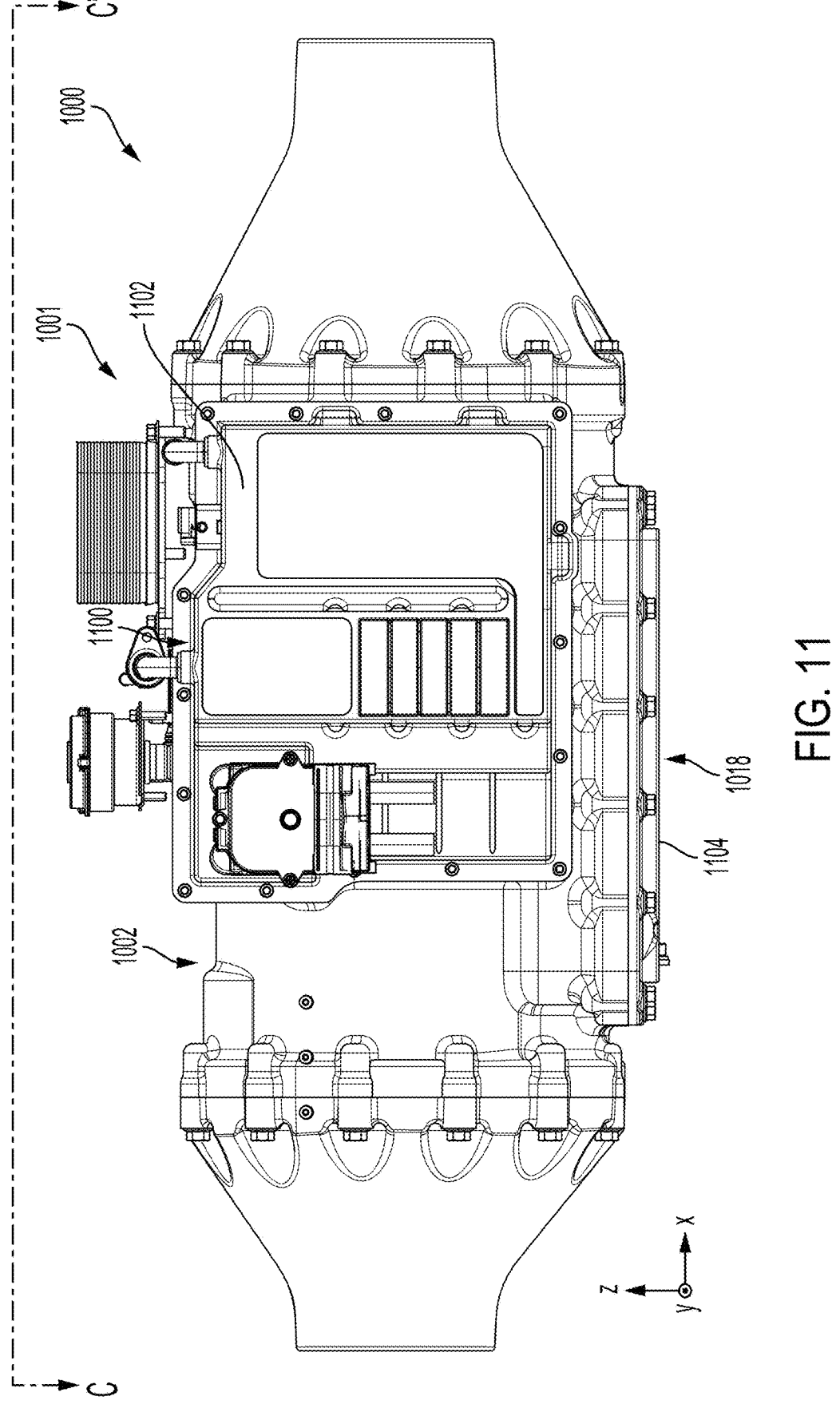
Figure 12:
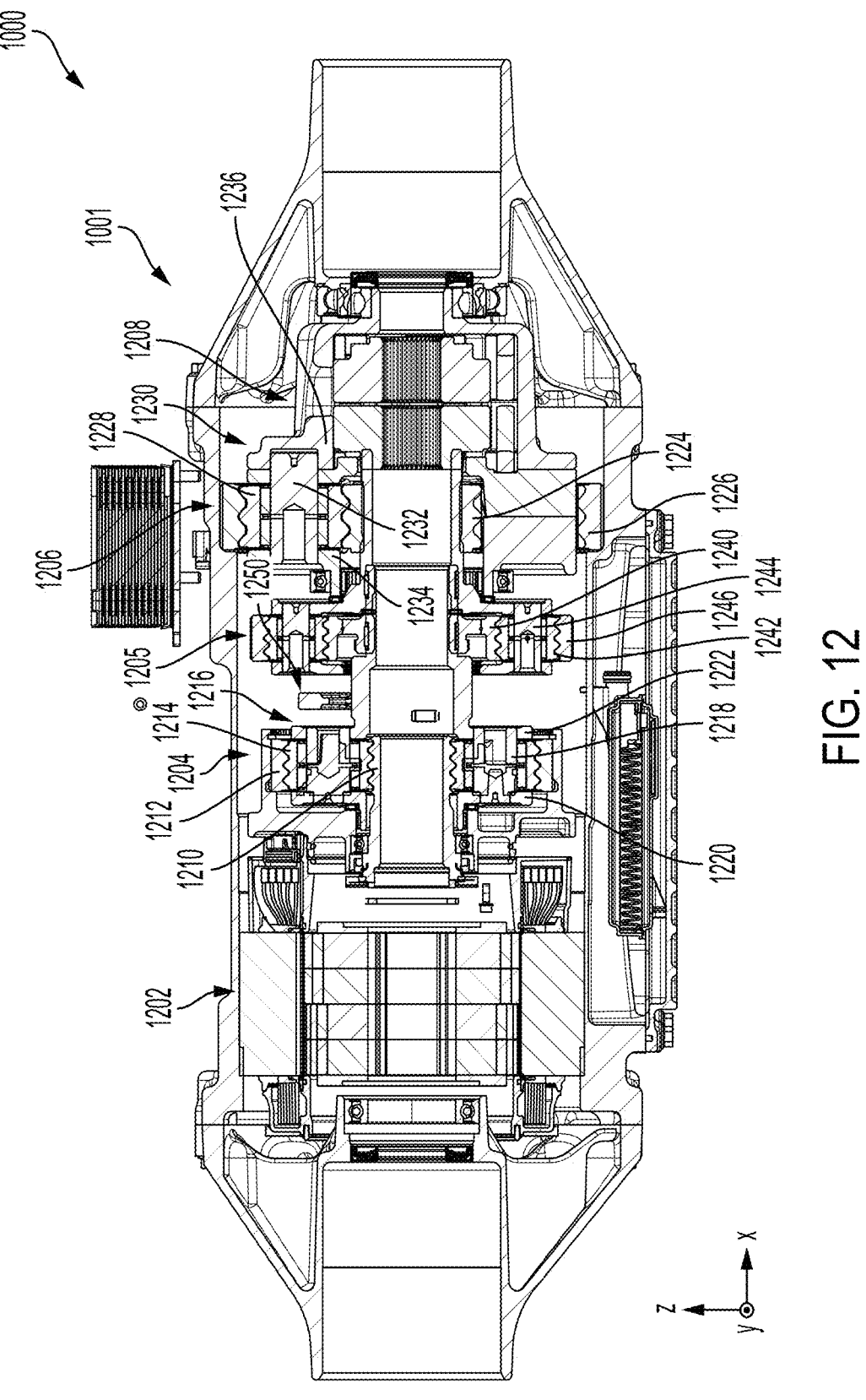

FIGS. 10-12 show a detailed example of an electric axle 1000 that has a component architecture that corresponds to the electric axle 200 depicted in FIG. 2. As such, the electric axle 1000 includes an electric machine, an input planetary gear set, and an output planetary gear set that are at least partially enclosed within a housing 1001.

FIG. 10 specifically shows a front view of the electric axle 1000 with the housing 1001. The housing 1001 may be divided into sections that are removably attached to one another. To expound, the housing 1001 includes a body 1002 with end covers 1004 and 1006 that are attached to opposing lateral sides 1008 and 1010 of the body. However, other housing configurations may be used in other examples. Bolts 1012 and/or other suitable attachment devices may be used to attach the end covers 1004 and 1006 to the body 1002 of the housing 1001.

In the illustrated example, the end covers 1004 and 1006 includes axle shaft openings 1014 through which axle shafts extend. An oil pan 1018 and/or an oil pump 1020 may be coupled to the housing body 1002. To elaborate, the oil pan 1018 is coupled to a lower side 1022 of the body 1002 in the illustrated example. Additionally, the oil pump 1020 is coupled to a longitudinal side 1024 of the body 1002 in the illustrated example. Further, a heat exchanger 1026 may also be coupled to the housing body 1002.

FIG. 11 specifically shows a rear view of the electric axle 1000 with the housing 1001. An inverter 1100 is removably coupled to the body 1002. In this way, the inverter 1100 is incorporated into the electric axle 1000. A face 1102 of the inverter 1100 may be parallel to the z-x plane, in one example. Further, a face 1104 of the oil pan 1018 may be parallel to the x-y plane. However, other inverter and/or oil pan arrangements have been contemplated. A cutting plane C-C' for the cross-sectional view depicted in FIG. 12 is also provided in FIG. 11 for reference.

FIG. 12 shows a cross-sectional view of the electric axle 1000 with a gear train 1201 and an electric machine 1202. The gear train 1201 includes an input planetary gear set 1204, a multi-speed planetary gear set 1205, and an output planetary gear set 1206, in the illustrated example. The electric axle 1000 further includes a differential 1208. The electric machine 1202 may be similar in size and construction to the electric machine 900 shown in FIG. 9.

The input planetary gear set 1204 again includes a sun gear 1210, a ring gear 1212 that is grounded by the housing 1001, and a set of planet gears 1214 that are rotatably mounted on a carrier 1216. The carrier 1216 again includes carrier shafts 1218 and an upstream section 1220 and a downstream section 1222 that are removably coupled to the carrier shafts. The carrier shafts 1218 and the upstream section 1220 are identical to the carrier shafts 622 and the upstream section 624 shown in FIG. 6. Further, the sun gear 1210, the planet gears 1214, and the ring gear 1212 are identical to the sun gear 610, the planet gears 620, and the ring gear 616, shown in FIG. 6, respectively. However, the downstream section 1222 of the carrier 1216 differs from the previously described downstream carrier sections. In this way, input planetary gear set components are used across electric axle platforms, thereby simplifying axle manufacture.

The output planetary gear set 1206 again includes a sun gear 1224, a ring gear 1226 that is grounded by the housing 1001, and a set of planet gears 1228 that are rotatably mounted on a carrier 1230. The carrier 1230 again includes carrier shafts 1232 and an upstream section 1234 and a downstream section 1236 that are removably coupled to the carrier shafts. The carrier shafts 1232 and the upstream section 1234 are identical to the carrier shafts 644 and the upstream section 646 shown in FIG. 6. Further, the sun gear 1224, the planet gears 1228, and the ring gear 1226 are identical to the sun gear 634, the planet gears 642, and the ring gear 638, shown in FIG. 6, respectively. However, the downstream section 1236 of the carrier differs from previously described downstream carrier sections. In this way, output planetary gear set components are used across electric axle platforms, thereby simplifying axle manufacture.

The multi-speed planetary gear set 1205 includes a sun gear 1240, planet gears 1242 that are rotatably mounted to a carrier 1244, and a ring gear 1246. A clutch 1250 is provided in the electric axle 1000. The clutch 1250 may be configured to selectively rotationally couple the carrier 1216 in the planetary gear set 1204 to the sun gear 1240 in the multi-speed planetary gear set 1205, in one position. The clutch 1250 may additionally be configured to selectively rotationally couple the carrier 1216 in the planetary gear set 1204 to the carrier 1244 in another position. The clutch 1250 may additionally be configured to operate in a neutral position where power flow between the planetary gear set 1204 and the multi-speed planetary gear set 1205.

Figure 20:
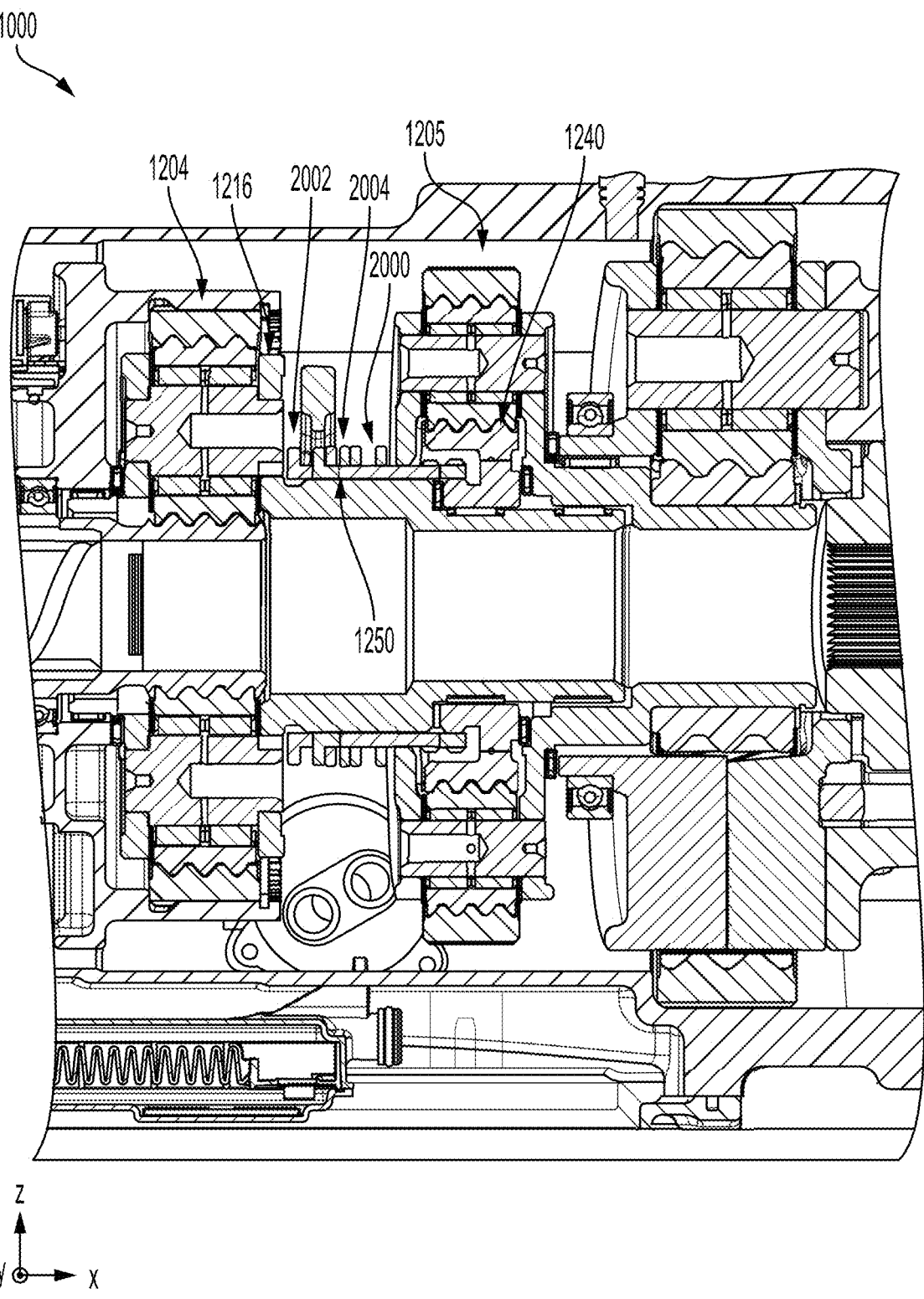
FIG. 20 shows a detailed view of the clutch included in the electric axle depicted in FIGS. 10-12.

FIG. 20 shows a detailed view of the clutch 1250 in the electric axle 1000. To elaborate, the different discrete operating positions of the clutch 1250 are illustrated in FIG. 20. It will be understood that the clutch may be controlled to place the clutch in its different operating positions based on axle and vehicle operating conditions. The position of the clutch 1250 where the carrier 1216 in the planetary gear set 1204 is rotationally coupled to the sun gear 1240 in the multi-speed planetary gear set 1205 is indicated at 2000. Additionally, the position of the clutch 1250 where the carrier 1216 in the planetary gear set 1204 is rotationally coupled to the carrier 1244 in the multi-speed planetary gear set 1205 is indicated at 2002 and the clutch's neutral position is indicated at 2004.

Figure 13:
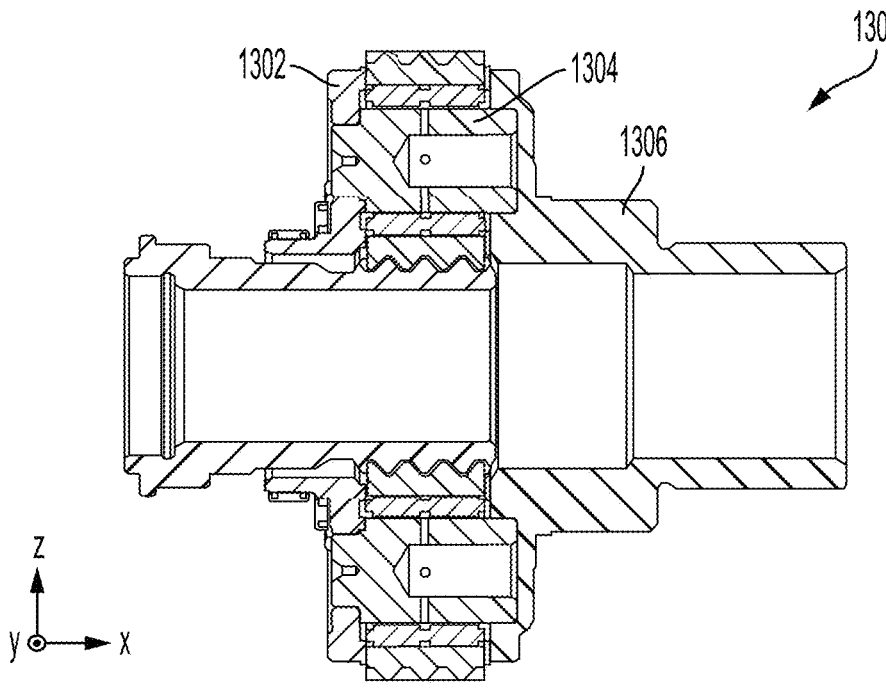
FIGS. 13-14 show detailed examples of carriers for an input planetary gear set.
Figure 14:
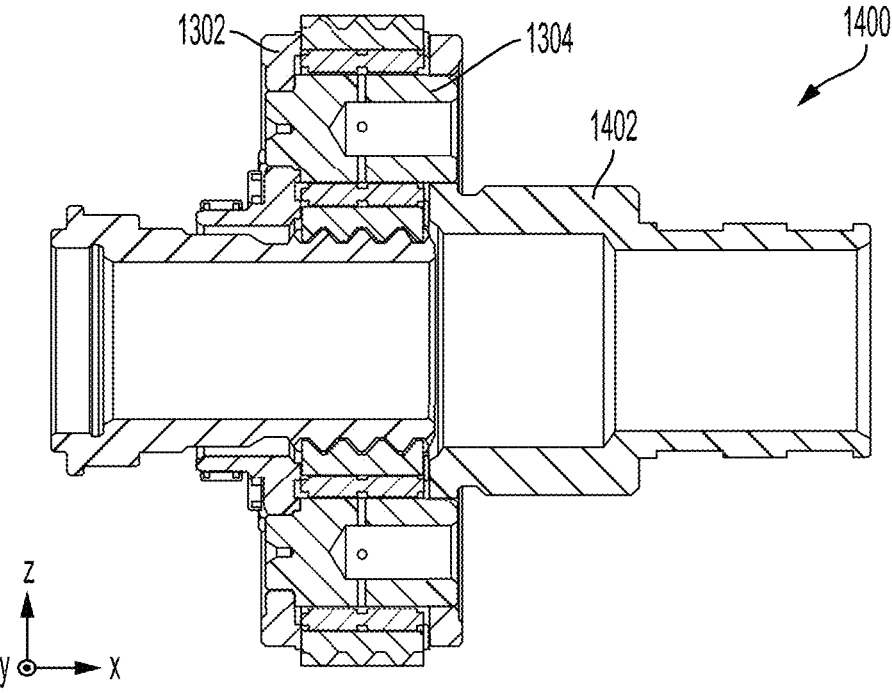

FIGS. 13-14 show different examples of carriers 1300 and 1400, respectively, that may be included in the electric axles described herein. Each of the carriers 1300 include an upstream section 1302 and carrier shafts 1304 which are identical in size and profile. However, a downstream section 1306 of the carrier 1300 shown in FIG. 13 differs from a downstream section 1402 of the carrier 1400 shown in FIG. 14 to enable the carrier to be modified for integration into different electric axle configurations. Using carriers with these features allow the modularity of the electric axles to be increased.

Figure 15:
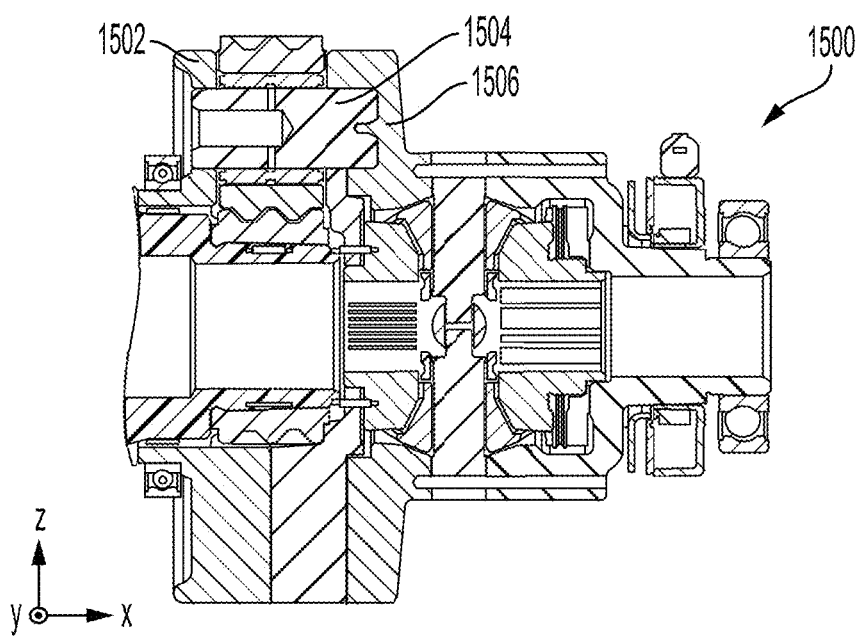
FIGS. 15-16 show detailed examples of carriers for an output planetary gear set.
Figure 16:
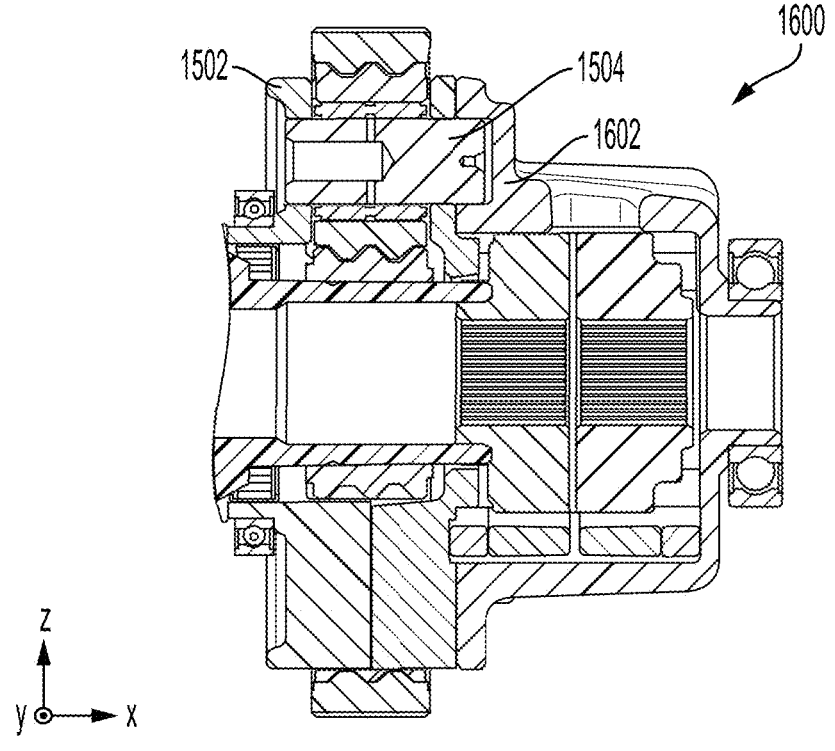

FIGS. 15-16 show different examples of carriers 1500 and 1600, respectively, that may be included in the input planetary gear sets of the electric axles described herein. Each of the carriers 1500 and 1600 include an upstream section 1502 and carrier shafts 1504 which are identical in size and profile. However, a downstream section 1506 of the carrier 1500 shown in FIG. 15 differs from a downstream section 1602 of the carrier 1600 shown in FIG. 16 to enable the carrier to be modified for integration into different electric axle configurations. Using carriers with these features allow the modularity of the electric axles to be increased.

Figure 17:
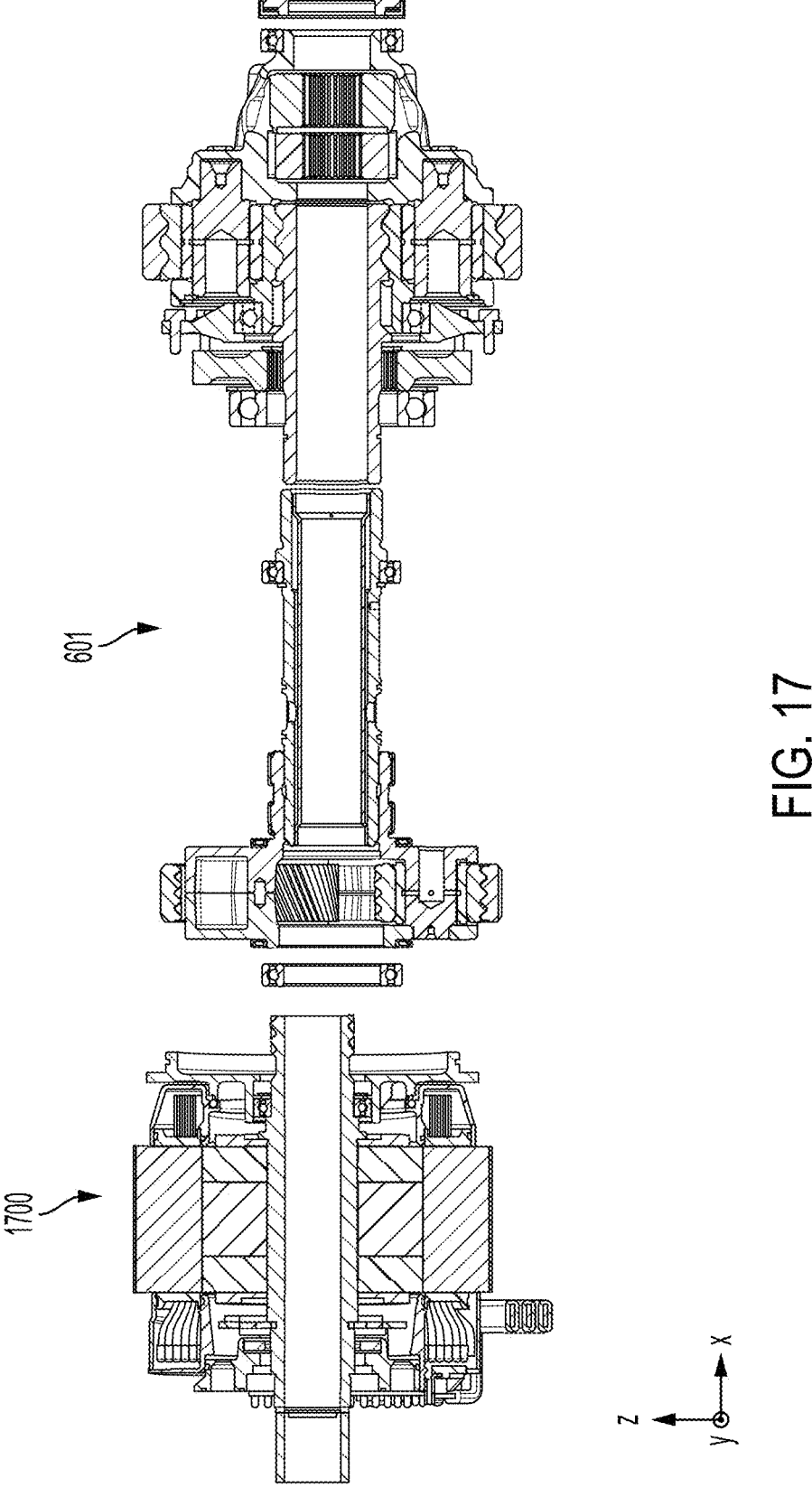
FIGS. 17-19 show different modular electric axle architectures.
Figure 18:
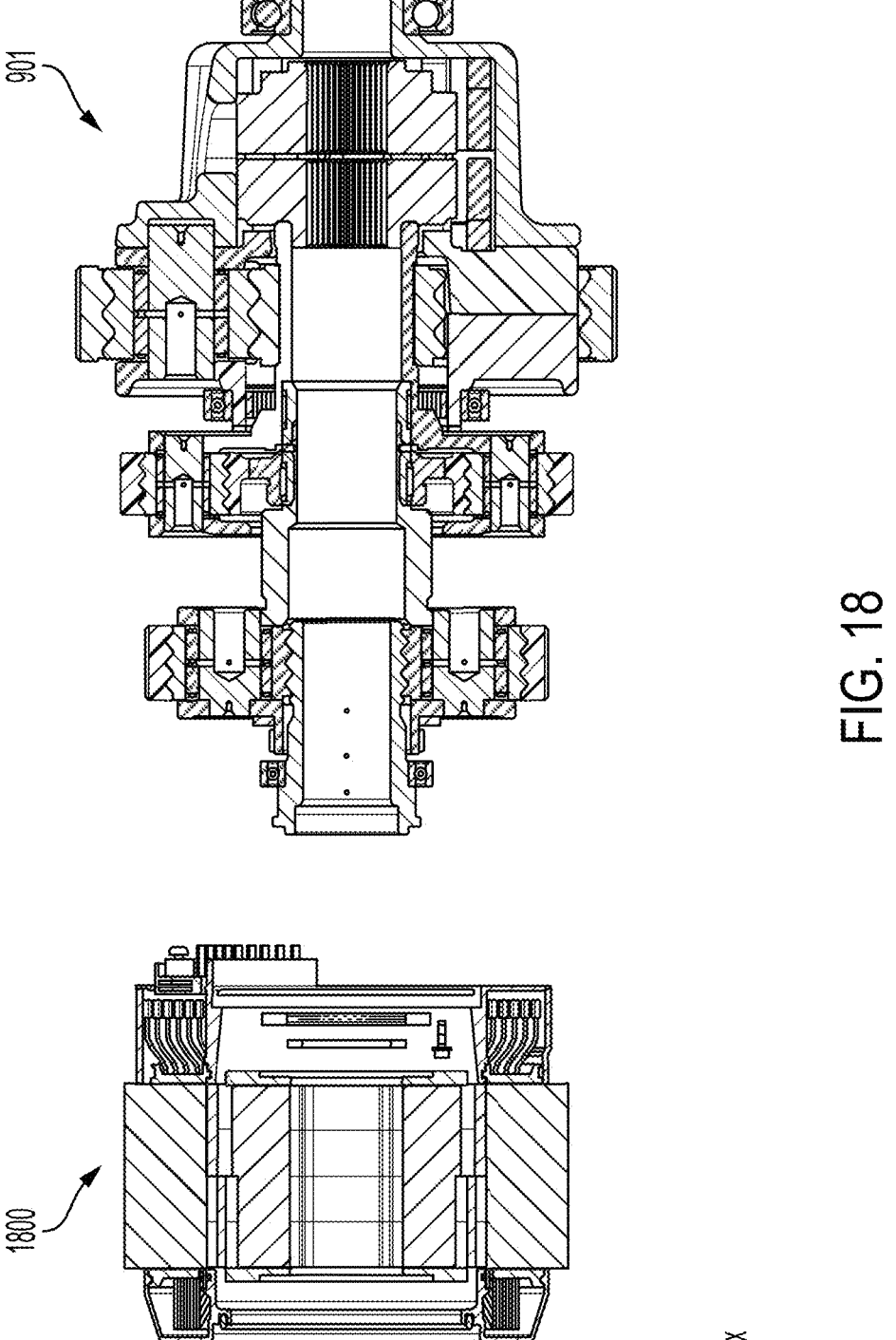
Figure 19:
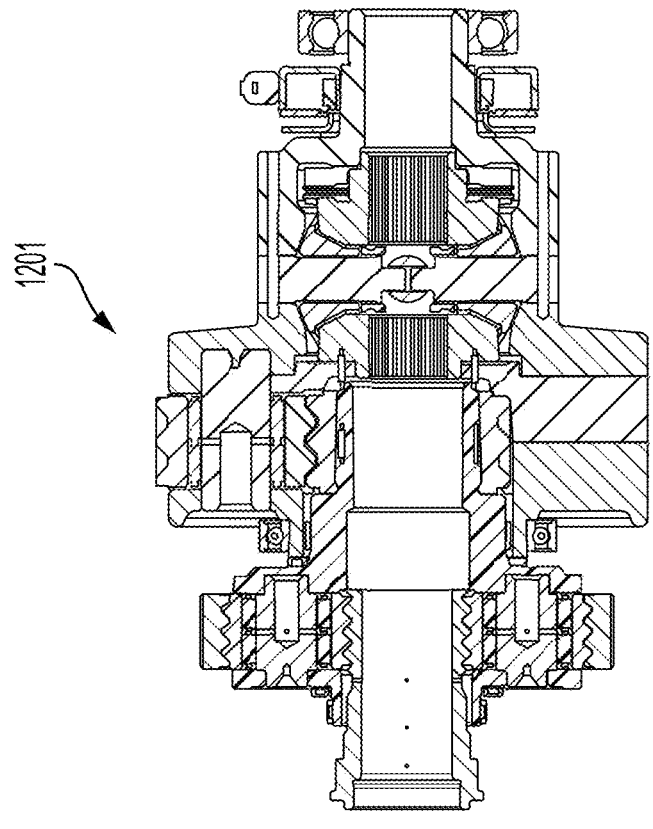
Figure 19:
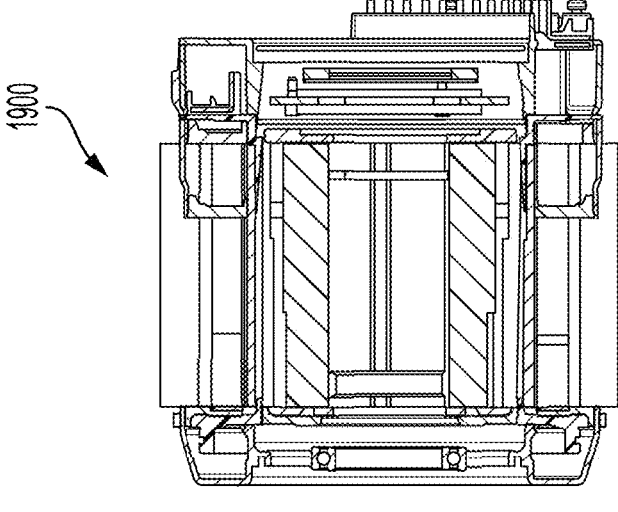
Figure 19:
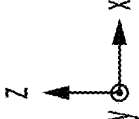

FIGS. 17-19 show different modular electric axle architectures where the traction motors are decoupled from the downstream gear trains. Specifically, different electric machines 1700, 1800, and 1900 shown in FIGS. 17-19 are included in the gear trains 601, 901, and 1201 of the electric axles 400, 700, and 1000 shown in FIGS. 6, 9, and 12, respectively. In this way, multiple combinations of traction motors and gear trains can be combined to customize the design to fit various applications while maintaining part reuse across variants of the designs to reduce manufacturing complexity.

The electric axles described herein may be included in a product line. The product line may be on offer to different customers but the axles in the product line include certain identical parts that are deployed in each of the axles to simplify manufacture and assembly of the different electric axles in the product line.

FIGS. 4-20 are drawn approximately to scale, aside from the schematically depicted components. However, the components may have alternate relative dimensions, in other embodiments.

FIGS. 1-20 show example configurations with relative positioning of the various components. However, the components may have other relative sizes, in other embodiments. It will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention is further described in the following paragraphs. In one aspect, an electric axle is provided that comprises a traction motor; and an input planetary gear set arranged coaxial to the traction motor and including: a sun gear rotationally coupled to the traction motor; a carrier including a first section coupled to multiple carrier shafts and a second section removably coupled to the multiple carrier shafts; and multiple planet gears rotationally mounted on the multiple carrier shafts; wherein the second section is rotationally coupled to a downstream component; and wherein the downstream component is arranged coaxial to the input planetary gear set. In one example, the downstream component may be a multi-speed planetary gear set. In another example, the downstream component may be an output planetary gear set. In another example, the input planetary gear set may be a simple planetary gear set. In another example, a ring gear in the input planetary gear set may be grounded. In another example, the electric axle may further comprise a differential rotationally coupled to the downstream component. In another example, the differential may be a torque-sensing limited-slip differential. In yet another example, the electric axle may further comprise an oil pan removably coupled to a housing. In yet another example, the electric axle may further comprise a heat exchanger and an oil pump coupled to the housing. In yet another example, the electric axle may further comprise a disconnect clutch configured to rotationally disconnect the downstream component from the input planetary gear set.

In another aspect, an electric beam axle is provided that comprises a traction motor; an input planetary gear set arranged coaxial to the traction motor and including: a sun gear rotationally coupled to the traction motor; a carrier including a first section coupled to multiple carrier shafts and a second section removably coupled to the multiple carrier shafts; a set of planet gears rotationally mounted on the multiple carrier shafts; and a ring gear that meshes with the set of planet gears and is grounded; wherein the second section is rotationally coupled to a multi-speed planetary gear set or an output planetary gear set. In one example, the electric beam axle may further comprise a housing including: a body that at least partially encloses the traction motor; and multiple end covers removably coupled to opposing sides of the body. In one example, the electric beam axle may further comprise a heat exchanger; and an oil pump coupled to the housing. Further, in one example, at least one of the heat exchanger and the oil pump may be coupled to a longitudinal side of the body. In one example, the electric beam axle may further comprise an inverter coupled to the body. In another example, the inverter may include a coolant inlet port and a coolant outlet port. In one example, the electric beam axle may further comprise a disconnect clutch configured to rotationally disconnect the multi-speed planetary gear set from the input planetary gear set.

In another aspect, an electric axle product line is provided that comprises a first electric axle comprising: a first traction motor; and a first input planetary gear set that includes: a first sun gear rotationally coupled to the first traction motor; a first carrier including a first section coupled to multiple carrier shafts and a second section removably coupled to the multiple carrier shafts; and a first set of planet gears rotationally mounted on the multiple carrier shafts; wherein the second section is rotationally coupled to a first downstream component; a second electric axle comprising: a second traction motor; and a second input planetary gear set that includes: a second sun gear rotationally coupled to the second traction motor; a second carrier including a first section coupled to multiple carrier shafts and a second section removably coupled to the multiple carrier shafts; and multiple planet gears rotationally mounted on the multiple carrier shafts; wherein the second section is rotationally coupled to a second downstream component; and wherein the first section and the multiple carrier shafts in the first carrier are identical to the second section and the multiple carrier shafts in the second carrier. In one example, the first electric axle may comprise a first output planetary gear set that is rotationally coupled to a first differential and the first input planetary gear set; the second electric axle may comprise a second output planetary gear set that is rotationally coupled to a second differential and the second input planetary gear set; and the first output planetary gear set and the second output planetary gear set may be identical in structure and size aside from sections of the first and second output planetary gear sets that are directly coupled to the first differential and the second differential, respectively. In another example, the first electric axle may comprise a first multi-speed planetary gear set that is rotationally coupled to the first input planetary gear set; the second electric axle may comprise a second multi-speed planetary gear set that is rotationally coupled to the second input planetary gear set; and the first multi-speed planetary gear set and the second multi-speed planetary gear set may be identical in structure and size.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and internal combustion engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle, comprising:
a traction motor; and
an input planetary gear set arranged coaxial to the traction motor and including:
    a sun gear rotationally coupled to the traction motor;
    a carrier including a first section coupled to multiple carrier shafts and a second section removably coupled to the multiple carrier shafts; and
    multiple planet gears included in a set of planet gears and rotationally mounted on the multiple carrier shafts via multiple bearings;
wherein the first section and the second section are positioned on opposing sides of the set of planet gears and the multiple bearings;
wherein the second section is directly rotationally coupled to a sun gear in a simple planetary gear set; and
wherein the simple planetary gear set is arranged coaxial to the input planetary gear set.

2. The electric axle of claim 1, wherein the simple planetary gear set is a multi-speed planetary gear set.

3. The electric axle of claim 1, wherein the simple planetary gear set is an output planetary gear set.

4. The electric axle of claim 1, wherein the input planetary gear set is a simple planetary gear set.

5. The electric axle of claim 4, wherein a ring gear in the input planetary gear set is grounded.

6. The electric axle of claim 1, further comprising a differential rotationally coupled to the simple planetary gear set.

7. The electric axle of claim 6, wherein the differential is a torque-sensing limited-slip differential.

8. The electric axle of claim 1, further comprising an oil pan removably coupled to a housing.

9. The electric axle of claim 8, further comprising a heat exchanger and an oil pump coupled to the housing.

10. The electric axle of claim 1, further comprising a disconnect clutch configured to rotationally disconnect a downstream component from the input planetary gear set.

11. An electric beam axle, comprising:

a traction motor;
an input planetary gear set arranged coaxial to the traction motor and including:
    a sun gear rotationally coupled to the traction motor;
    a carrier including a first section coupled to multiple carrier shafts and a second section removably coupled to the multiple carrier shafts;
    a set of planet gears rotationally mounted on the multiple carrier shafts; and
    a ring gear that meshes with the set of planet gears and is grounded;
wherein a body grounds the ring gear in the input planetary gear set;
wherein the first section and the second section are positioned on opposing sides of the set of planet gears;
wherein the second section is directly rotationally coupled to a sun gear in a simple planetary gear set; and
wherein a ring gear in the simple planetary gear set is grounded by a housing.

12. The electric beam axle of claim 11, wherein the housing includes:
the body that at least partially encloses the traction motor; and
multiple end covers directly removably coupled to opposing sides of the body;
wherein the multiple end covers each circumferentially surround an axle shaft.

13. The electric beam axle of claim 12, further comprising:
a heat exchanger; and
an oil pump coupled to the housing.

14. The electric beam axle of claim 13, wherein at least one of the heat exchanger and the oil pump are coupled to a longitudinal side of the body.

15. The electric beam axle of claim 12, further comprising an inverter coupled to the body, wherein the inverter is electrically coupled to the traction motor.

16. The electric beam axle of claim 15, wherein the inverter includes a coolant inlet port and a coolant outlet port.

17. The electric beam axle of claim 11, further comprising a disconnect clutch configured to rotationally disconnect the simple planetary gear set from the input planetary gear set.

* * * * *